United States Patent [19]

Ernst et al.

[11] 4,202,847
[45] May 13, 1980

[54] APPARATUS AND METHOD FOR COOLING COOLING WATER ESPECIALLY IN COOLING TOWERS

[75] Inventors: Gunter Ernst, Strasse des Roten Kreuzes, D-7500 Karlsruhe, Fed. Rep. of Germany; Edmund Baer, Karlsruhe; Dieter Wurz, Pfinztal, both of Fed. Rep. of Germany

[73] Assignee: Gunter Ernst, Karlsruhe, Fed. Rep. of Germany

[21] Appl. No.: 931,001

[22] Filed: Aug. 4, 1978

Related U.S. Application Data

[63] Continuation-in-part of Ser. No. 706,301, Jul. 19, 1976, abandoned.

[30] Foreign Application Priority Data

Jul. 21, 1975 [DE] Fed. Rep. of Germany ....... 2532544

[51] Int. Cl.$^2$ .............................................. B01F 3/04
[52] U.S. Cl. ............................ 261/161; 165/DIG. 1; 261/112; 261/DIG. 11; 261/DIG. 77
[58] Field of Search ..................... 261/97, 98, 109–112, 261/158–161, DIG. 11, DIG. 77; 165/166, DIG. 1

[56] References Cited

U.S. PATENT DOCUMENTS

| | | | |
|---|---|---|---|
| 1,745,297 | 1/1930 | Harry | 261/111 X |
| 2,285,668 | 6/1942 | Korth | 261/111 X |
| 3,669,425 | 6/1972 | Copeland | 261/112 X |
| 3,722,227 | 3/1973 | Esser et al. | 261/112 X |
| 3,739,556 | 6/1973 | Waters | 261/112 X |
| 3,761,064 | 9/1973 | Selway | 261/109 X |
| 3,782,703 | 1/1974 | Kolar | 261/112 |
| 3,830,684 | 3/1974 | Hamon | 261/112 |
| 3,846,519 | 11/1974 | Spangemacher | 261/DIG. 11 |

FOREIGN PATENT DOCUMENTS

| | | | |
|---|---|---|---|
| 857642 | 12/1952 | Fed. Rep. of Germany | 261/112 |
| 2146205 | 3/1972 | Fed. Rep. of Germany | 261/DIG. 11 |
| 2435623 | 2/1975 | Fed. Rep. of Germany | 261/DIG. 11 |
| 2236158 | 1/1975 | France | 261/DIG. 11 |
| 484635 | 5/1938 | United Kingdom | 261/112 |

Primary Examiner—Richard L. Chiesa
Attorney, Agent, or Firm—L. Lawton Rogers, III

[57] ABSTRACT

A water cooling tower and method which provides for both wet and dry cooling within the same vertical space and significantly reduces the discharge of water particles out of the tower. Water is deposited on one side of each of a plurality of trickler plates and flows downwardly under the influence of gravity substantially undisturbed as a low speed film. Air flows at low speed by natural draught in a substantially undisturbed path on the other side of each of the plates. Important dimensional ratios and construction details are disclosed.

28 Claims, 19 Drawing Figures

APPARATUS AND METHOD FOR COOLING COOLING WATER ESPECIALLY IN COOLING TOWERS

RELATED APPLICATION

This abandoned application is a continuation-in-part application of Application Ser. No. 706,301 filed July 19, 1976.

BACKGROUND OF THE INVENTION

The instant invention relates to an apparatus for cooling water, especially in cooling towers, comprising a wet cooling portion in which the water which trickles down and is to be cooled is contacted directly with air flowing by, and a dry cooling portion in which the water is separated by walls from the air flowing by.

In conventional wet cooling towers the trickler plates are normally oriented with their width in vertical direction and cooling water is sprayed on both surfaces and then trickles down. The water is exposed to the air flowing by in upward direction at both sides of the trickler plate and is thereby cooled. Because of the direct contact of the water with the air on both sides of the trickler plates a considerable portion of the cooling water evaporates and is discharged from the cooling tower in the form of vapour clouds. Apart from the loss of water this has undesired ecological influences.

Other prior art wet cooling towers such as that disclosed in the Copeland U.S. Pat. No. 3,669,425 dated June 13, 1972, recognize the misting problems and employ mist eliminators or baffles to reduce water loss by the centrifugal forces generated by sharp deflections in the air flow.

Also dry cooling towers are known with which the cooling water is not directly contacted with the air but instead is passed through finned tubes or the like. Such finned tubes are expensive. Besides, the cooling performance is much poorer than with wet cooling towers because no evaporation of water takes place.

Cooling towers of the type mentioned above have been proposed, which incorporate both wet cooling and dry cooling portions in the one tower, separate air streams flowing past the respective wet and dry cooling portions.

An object of the present invention is to produce an apparatus of the type specified which will provide an excellent combination of the advantages of wet and dry cooling, with good mixing of the wet and dry air streams, and which will be simple and economical to manufacture.

Accordingly, it is an object of the instant invention to provide a novel method and cooling tower which has a much simpler structure than those generally known.

It is a further object of the instant invention to provide a novel method and cooling tower with an optimum combination of the advantages of wet cooling and dry cooling in the same vertical space.

It is still a further object of the invention to provide a novel method and cooling tower with good mixing of the wet and dry air streams.

To meet these and other objects which will become apparent as the description proceeds it is provided, in accordance with the invention, that trickler plates which are essentially wetted on one side form the wet cooling portion with their wetted sides, while their dry sides form the dry cooling portion, and each duct formed between two adjacent trickler plates being bounded on one of its sides by a wet face of a trickler plate and on its opposite side by the oppositely-facing dry face of an adjacent plate, namely the trickler plates, with wet cooling elements and dry cooling elements in alternating arrangement.

With the apparatus according to the invention, the cooling water which has become heated and is to be cooled again impinges only on one side of the trickler plates and consequently also runs down only on one side. The other side, i.e., the opposite surface, remains essentially dry. The result thereof is that a considerably smaller water surface is exposed directly to the air and consequently subjected to wet cooling. The air flowing by along the other dry surface of each trickler plate effects cooling in the same way as with the dry cooling process.

Without any additional device this arrangement warrants good mixing above the trickler plates of the "wet" and "dry" air streams which flow in parallel through the wet cooling elements and through the dry cooling elements, the structure practically causing no more expenditure than the conventional wet cooling towers.

This makes it possible to diminish the disadvantages of dry cooling and wet cooling and to combine the advantages of these two cooling processes. The expensive finned tubes or the like, normally required for dry cooling, are not necessary. Instead the trickler plates may consist of a single wall and be given their necessary configuration simply by an inclined arrangement or by bending. This is very little additional expenditure in manufacture as compared to the vertical trickler plates used in wet cooling towers.

The desired effect can be obtained merely by an appropriate configuration of the trickler plates, by arranging them at an angle with respect to the vertical at least in an area in which the cooling water impinges on the trickler plates.

In this context it should be especially noted that the trickler plates may be made from thin-walled material such as sheet metal or plastics so that much lighter structures can be obtained in comparison with finned tube structures. This fact also reduces the expenditure for the carrier structure of the trickler plates.

The trickler plates may be formed with bulges on their "wet side" in order to reduce the wet cooling surface still more.

If the trickler plates are directly exposed to the cooling water which is sprayed down upon them, wetting of the underside of the inclined section cannot be prevented, although with a minor portion of the water. As a remedial measure a preferred modification of the apparatus according to the invention provides for the arrangement of plane or corrugated (for greater rigidity) and essentially vertically oriented alignment plates above the trickler plates. Conveniently, these alignment plates are of lesser height than the trickler plates and cause drops to fall only in vertical direction on the inclined sections of the trickler plates. Also the alignment plates may be inclined with respect to the vertical, at least in the area on which the cooling water impinges.

The exclusive wetting of one side of the trickler plates is completely guaranteed if the lower ends of the alignment plates are laterally offset with respect to the upper ends of the trickler plates.

The trickler plates themselves may be designed differently within the scope of the invention. In a particularly simple embodiment the upper sections of the trickler plates are bent over smoothly or sharply relative to the lower vertical sections.

The trickler plates may also be inclined over their entire height and may be provided in their upper sections with dripping noses pointing downwardly and being interconnected by guide means guiding the trickling water towards their points. The guide means may be embodied simply by curved bending lines in the sheet metal of the trickler plates, the lowermost ends of these bending lines terminating in these dripping noses. With this type of design the alignment plates may be eliminated altogether because cooling water sprayed on the undersides of the trickler plates is caught already in the upper area at the dripping noses and is led off along the upper side.

It is also an object of the instant invention to vary the proportions between wet cooling and dry cooling. In a first embodiment of the invention to meet this object the trickler plates can be pivoted from their vertical position in which their upper ends are aligned with the lower ends of the alignment plates into a position in which their upper ends are disposed between the lower ends of the alignment plates.

In a second embodiment in which the upper ends of the trickler plates are vertically oriented the variation can be obtained by either pivoting the alignment plates with their lower ends out of a position of alignment with the upper ends of the trickler plates into an intermediate position or by displacing the alignment plates in parallel relative to the trickler plates or vice versa.

The desired effect of the invention can also be obtained by appropriate configuration of the spray device alone. To this end a further embodiment of the invention provides for the spray plane of the water discharged from the spray device to be inclined with respect to the vertical.

Also in this case the proportions of wet cooling and dry cooling can be varied by changing the inclination of the spray plane by mechanical adjustment of the spray device about a horizontal axis or by changing the cooling water inlet pressure.

The designs according to the invention of the trickler plates and of the spray device may also be used in combination. Alignment plates may be eliminated altogether if trickler plates which are inclined at least in their upper sections are used in combination with the inclined spray planes.

THE DRAWINGS

The above and many other objects and advantages will be apparent to one skilled in the art to which the invention pertains from the claims and from the specification and drawings where the invention is more fully explained with additional details and by reference to several preferred embodiments shown in diagrammatic drawings, of which:

THE DETAILED DESCRIPTION

Figure 1:
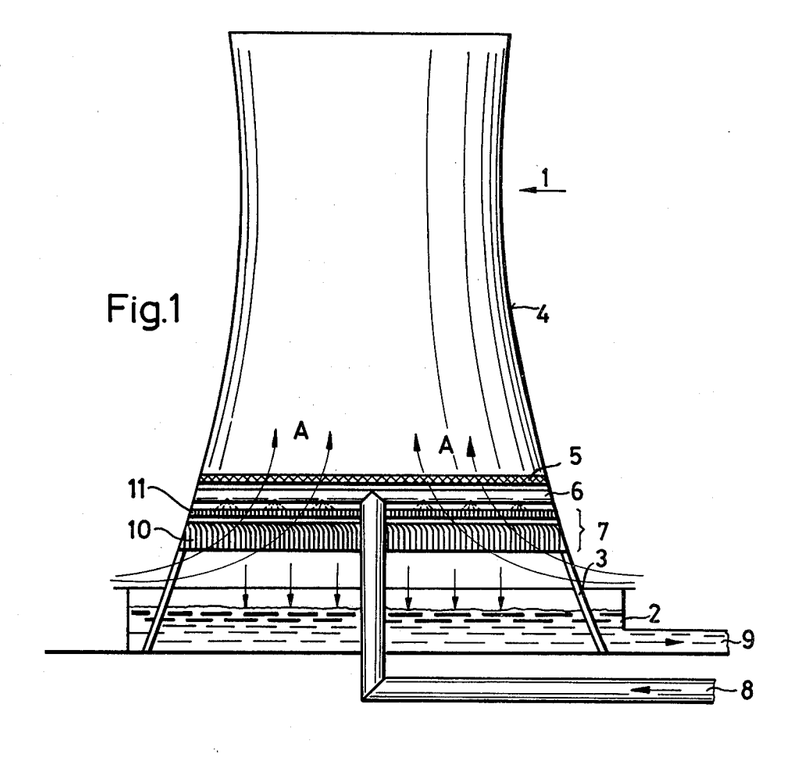
FIG. 1 is a conventional natural draught cooling tower with an apparatus according to the invention installed in the same.

FIG. 1 shows a natural draught cooling tower 1 of conventional exterior appearance. A collecting tank for cooled water is arranged on the foundation of cooling tower 1. Supports 3 carrying the cooling tower wall 4 rest on the bottom of collecting tank 2. Inside the cooling tower wall there are provided a drop separator 5, a cooling water distributor 6, and trickler units generally designated 7. Cooling water which has become heated and comes, for instance, from a thermal power station is introduced into distributor 6 through a duct 8. The water to be cooled falls down from the trickler units 7 into collecting tank 2 and, while passing the trickler units, it is cooled by ambient air penetrating between the supports 3 and flowing in the direction of arrows A. On its way the ambient air heats up so that it adopts a lower density inside the cooling tower than outside of the same and therefore ascends. The air which is enriched with evaporated water is discharged from the opening at the crown of cooling tower 1. The cooled water is returned through a duct 9 to the thermal power station or the like.

Figure 2:
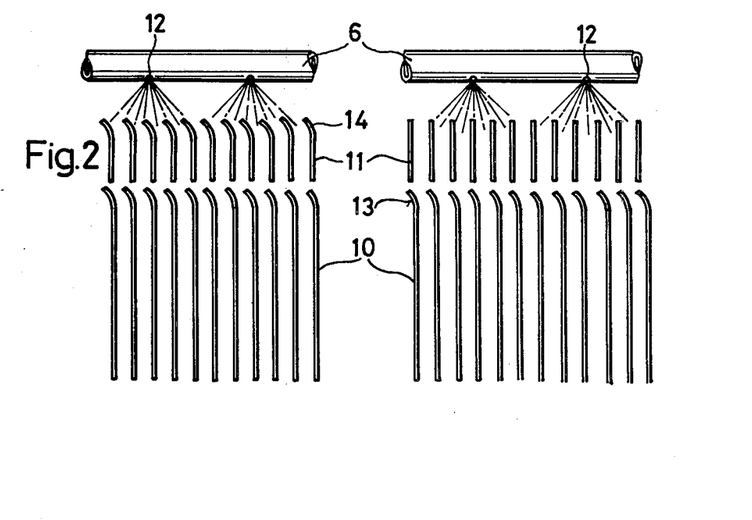
FIG. 2 shows side by side very diagrammatic different embodiments of the apparatus according to the invention.

The trickler units comprise trickler plates 10 and alignment plates 11 arranged in parallel above the same and being oriented with their longitudinal direction in horizontal sense and with their width approximately vertical. The water is sprayed on the alignment plates by distributor 6 through nozzles, spray apertures 12 or the like, as may be seen in detail in FIG. 2. The alignment plates 11 function to deflect the water issuing from the spray apertures in various directions so that it will fall down vertically from their lower ends and impinge on the upper inclined sections 13 of the trickler plates which are arranged offset below the alignment plates. As a result of this arrangement only one surface of the trickler plates, in FIG. 2 the right-hand side, is wetted by the water to be cooled, whereas the surfaces on the left side, as seen in FIG. 2, remain dry. Thus on the right side of trickler plates 10 the ambient air which flows from below to the top along the trickler plates is in contact with the water to be cooled, whereas on the left side the air contacts the dry surface of trickler plates 10. The water surface directly exposed to the ambient air thus is only half of that exposed in the case of a structure with which both sides of the trickler plates are wetted. Consequently the amount of water evaporated is reduced accordingly so that the moisture content in the vapour cloud and the undesired ecological influence are reduced.

The only difference between the two variants shown side by side in FIG. 2 resides in the fact that with the embodiment shown on the left side also the alignment plates have an inclined upper section 14. This will produce a certain combined wet and dry cooling effect also with these plates, although it cannot be prevented with this arrangement that the left surfaces of the alignment plates, as seen in FIG. 2, likewise become wetted to a certain extent.

In the embodiment shown on the right-hand side in FIG. 2 the alignment plates are completely plane and vertically oriented so that cooling water which is discharged through spray apertures 12 wets both sides of alignment plates 11 equally. However, the lateral offsetting of trickler plates 10 with respect to alignment plates 11 (realized also with the left-hand alternative) makes sure that also with the right-hand alternative the water drops only on the right surfaces of the trickler plates so that their left sides, as seen in FIG. 2, remain dry.

Plates 10, 11 may be made from thin sheet metal or plastics so that a light-weight, inexpensive structure can be realized. The only additional finishing step as compared to conventional vertical trickler plates resides in the bending of the upper sections 13 of the trickler plates.

Figure 3:
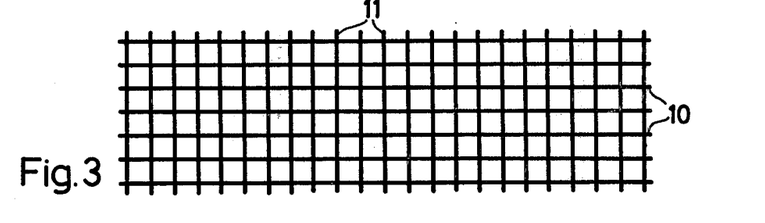
FIG. 3 is a top plan view of a modified embodiment of the apparatus according to the invention.

FIG. 3 is a top plan view of an alternative embodiment with alignment plates 11 and trickler plates 10 in crosswise arrangement.

Figure 4:
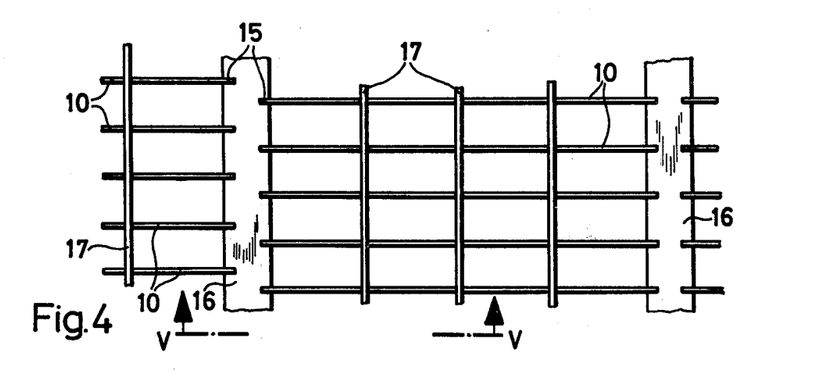
FIG. 4 is a top plan view of an apparatus according to the invention, principally as shown in FIG. 2.
Figure 5:
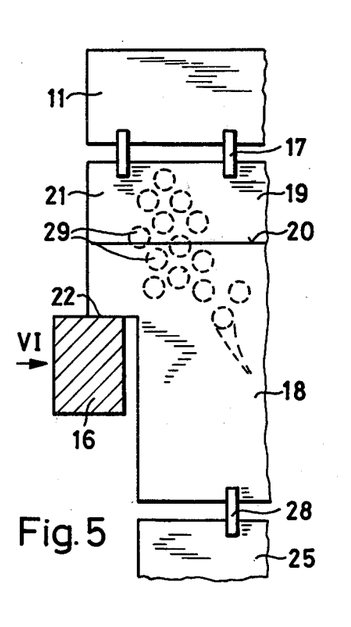
FIG. 5 is a sectional view along line V—V in FIG. 4 to an enlarged scale.
Figure 6:
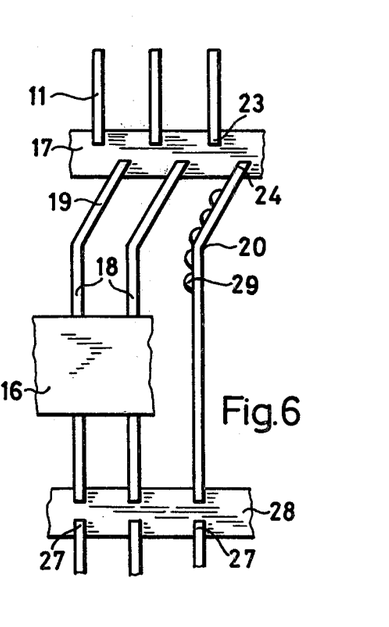
FIG. 6 is an elevational view as seen in the direction of arrow VI in FIG. 5.

FIGS. 4, 5 and 6 show a structural embodiment of the arrangement principle shown in the right half of FIG. 2 with which the alignment plates 11 and the trickler plates 10 are arranged in parallel. FIG. 4 is a diagrammatic top plan view of the trickler plates 10 alone which are supported or suspended by their lateral ends 15 on beams 16 of a support structure. Trickler plates 10 which are made of sheet metal are kept at mutual spacings by combs 17 which at the same time serve to support the alignment plates 11 arranged above the same but not shown in FIG. 4. This will become apparent from FIGS. 5 and 6 which are to a larger scale and more detailed than FIG. 4.

The trickler plates 10 are subdivided into a lower vertically oriented section 18 and an upper inclined section 19 bent and separated from the lower section along edge 20. At its lateral ends each trickler plate 10 is provided with a projection 21 extending across sections 18, 19 and having a lower horizontal support surface 22 by means of which the trickler plates are supported on beams 15. Above the trickler plates the alignment plates 11 are arranged offset in such manner that their lower ends lie above the inclined upper sections 19 of trickler plates 10. In the same manner as the trickler plates also the alignment plates are kept spaced apart by the combs 17 which may be made from plastics. These combs 17 are provided along their upper edge with vertical recesses 23 at the desired spacings to receive alignment plates 11 and along their lower edge with correspondingly inclined recesses 24 to receive the upper inclined ends of trickler plates 10. The recesses 23, 24 are offset in the combs in accordance with the desired lateral offsetting of trickler plates 10 with respect to alignment plates 11.

FIGS. 5 and 6 show an example of the embodiment of the trickler plates. The trickler plate shown at the far right side in FIG. 6 is provided with bulges 29 on its left wet side. The arrangement of these bulges may be gathered from FIG. 5. These bulges 29 serve to diminish the wet surface because the water flowing down in the recesses between the bulges 29 leaves these bulges partly dry. This serves to further reduce the proportion of water evaporated.

Figure 7:
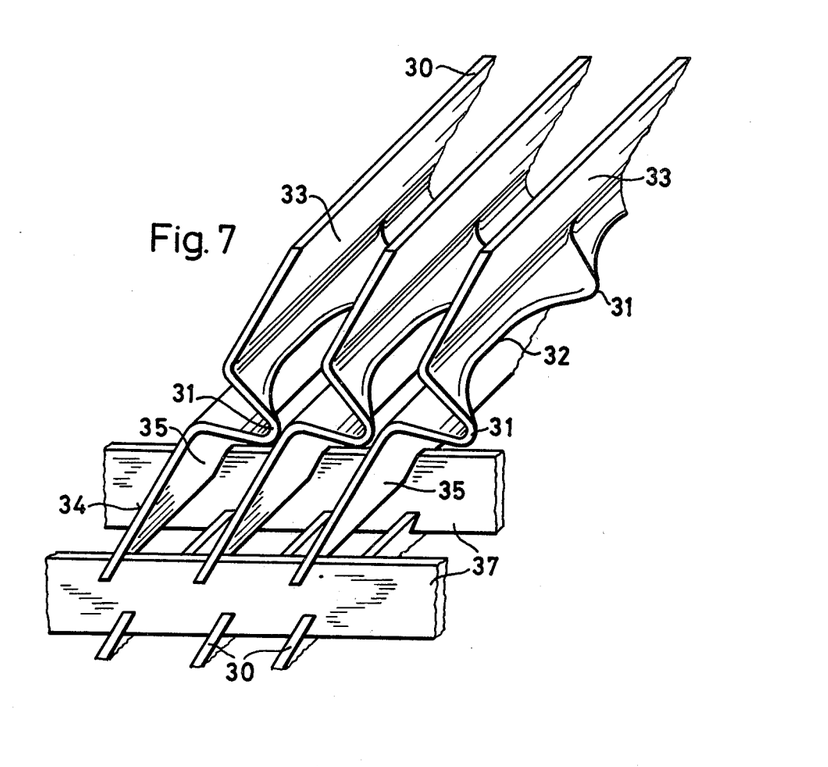
FIG. 7 is a perspective view of another embodiment of the apparatus according to the invention.

FIG. 7 shows trickler plates 30 which are of fundamentally different design than those shown in FIGS. 5 and 6. These trickler plates 30 are arranged inclined over their entire height and have projecting dripping noses 31 in their upper halves. Several such dripping noses 31 are provided spaced horizontally and are connected by a drop guide means in the form of a bend line 32. This bend line 32 has its highest position between the dripping noses and its lowest at the dripping noses 31. The dripping noses 31 are slightly downwardly inclined. It is obvious that water which may possibly be sprayed on the upper section 33 of the right-hand surface, as seen in FIG. 7, will collect at dripping noses 31 and fall down on the lower section 34 of the left surface. The lower sections 35 of the right surfaces which may be longer than the upper sections 33 by any desired extent consequently remain completely dry. Therefore the embodiment according to FIG. 7 may completely dispense with alignment plates such as used with the preceding embodiments.

The embodiment according to FIG. 7 also comprises combs 37 for proper mutual arrangement of rows of trickler plates 30 arranged above one another.

Figure 8:
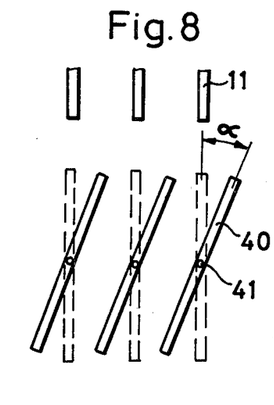
FIGS. 8, 9 and 10 show further modified apparatus according to the invention with variable wet cooling and dry cooling proportions.
Figure 9:
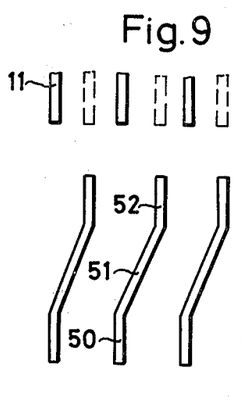
Figure 10:
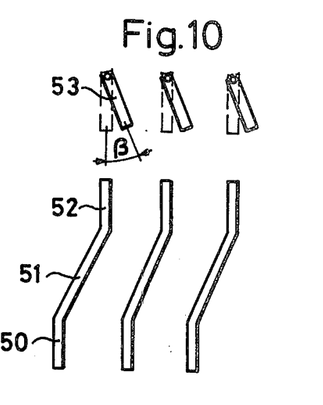

FIGS. 8, 9 and 10 show variant embodiments with which the relationship between wet cooling and dry cooling can be varied. In the case of the embodiment shown in FIG. 8, alignment plates 11 and trickler plates 40 are arranged in common vertical planes. The trickler plates 40 are pivotal by an angle from the position of vertical alignment with the alignment plates into an inclined position. The pivoting movement is effected about a fulcrum 41 which lies below the upper end of each trickler plate 40.

In their extreme pivot position (angle α) the upper ends of trickler plates 40 are offset with respect to the lower ends of alignment plates 11. In this case, only the left surfaces of trickler plates 40, as seen in FIG. 8, are wetted so that a combined wet cooling and dry cooling effect is obtained. If, on the other hand, the trickler plates are in vertical position, both sides are wetted so that a pure wet cooling effect is obtained.

Trickler plates 50 of identical design are used with the embodiments according to FIGS. 9 and 10, they are similar to the embodiment shown in FIGS. 4 to 6 and have an inclined upper section 51 of the upper end 52 of which, however, is vertically oriented. In the case of the embodiment according to FIG. 9 the alignment plates 11 arranged above the trickler plates 50 are designed for joint parallel displacement. If the alignment plates are oriented in the position shown in broken lines pointing toward the upper ends 52 of trickler plates 50, both sides of the trickler plates will become wetted. However, if the alignment plates are displaced in parallel toward the left into the position shown in continuous lines, only the left side of the trickler plates 50, as seen in FIG. 9, is wetted. Again in the first case the cooling effect will be purely wet cooling, whereas in the second case a combined wet cooling and dry cooling effect is obtained. The consequences are the same if the trickler plates 50 are arranged for parallel displacement instead of the alignment plates 11.

The trickler plates 50 shown in FIG. 10 have the same design as in the embodiment shown in FIG. 9. In this case, however, the alignment plates 53 which are oriented toward the upper ends 52 of trickler plates 50 are pivotal from this position in the direction shown by an angle β in anti-clockwise sense, i.e., in a direction toward the left surfaces of trickler plates 50. In this manner the same effect can be obtained as with the parallel displacement according to FIG. 9.

Figure 11A:
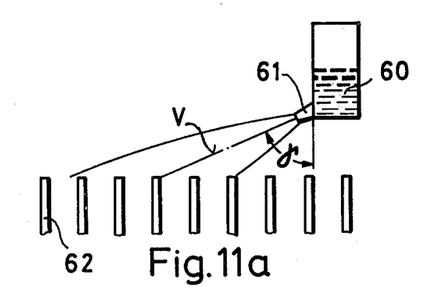
FIGS. 11a to 11d show four variants of a spray device according to the invention.
Figure 11B:
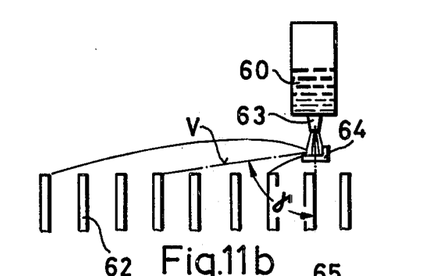
Figure 11C:
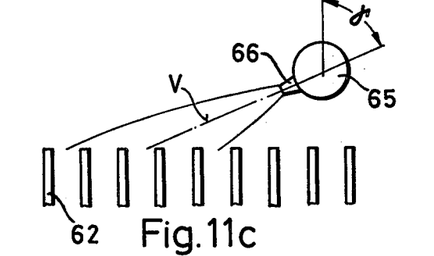
Figure 11D:
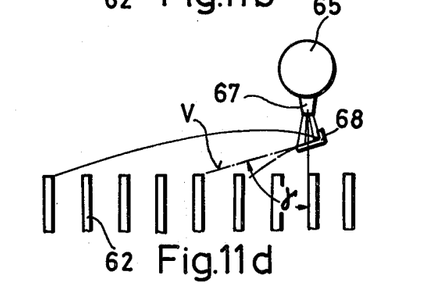
Figure 12B:
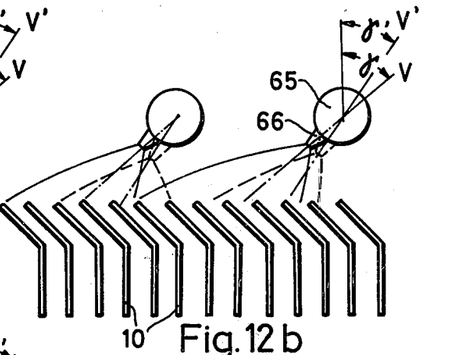
FIGS. 12a and 12b show two variants with the spray device and the trickler units designed according to the invention.
Figure 12C:
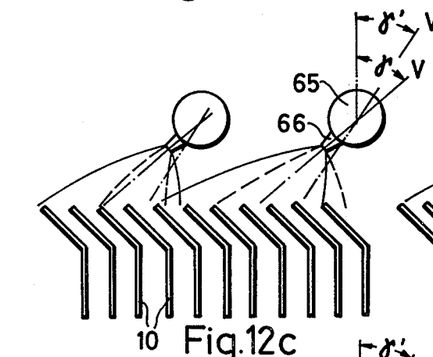
Figures 13A, 13B:
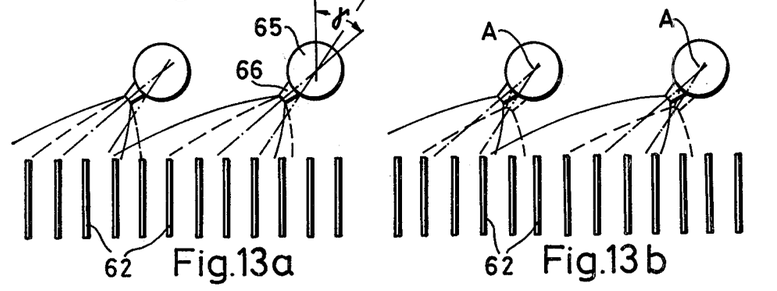
FIGS. 13a and 13b show two further variants of the spray device according to the invention; and, FIG. 14 schematically shows a further variant of the trickler plates.

FIGS. 11 to 13 show variant embodiments of the spray devices. In FIGS. 11a to 11d the spray plates are shown above alignment or trickler plates 62 which are arranged with their widths in vertical direction. In all of the embodiments the spray devices are arranged above the alignment or trickler plates, respectively, and their longitudinal extension is horizontal and parallel to the alignment or trickler plates. In the case of the embodiment shown in FIGS. 11a and 11b the spray devices comprise distributor channels 60 with mouth pieces 61 disposed at equal spacings and vertically with respect to the plane of the drawing. In the case of FIG. 11a the mouht pieces 61 and thus the spraying plane V are inclined by an angle γ with respect to the vertical. The result thus obtained is the wetting only of the right sides, as seen in the drawing, of the trickler plates or alignment plates 62. An inclination in the upper sections of the plates is not necessary.

In the case of FIG. 11b the mouthpieces 63 of the distributo channel 60 are vertically oriented. Below the mouthpieces 63, however, a water jet deflecting profile 64 is provided in the form of a hseet metal have an L-shaped cross section or the like. The deflector serves to deflect the liquid jets issuing from the mouthpieces by an even greater angle γ so as to obtain a spraying plane V which is even more inclined with respect to the vertical.

With the embodiment shown in FIG. 11c a distributor tube 65 is provided which has mouthpieces 66 inclined at an angle γ relative to the vertical. In FIG. 11d, on the other hand, the mouthpieces 67 of a distributor tube 65 are oriented vertically downward and guide their jets on to a deflecting profile 68, the effect and configuration of which correspond to the water jet deflecting profile 64.

FIGS. 12a and 12b and 13a and 13b show examples of how to vary the wet cooling and dry cooling proportion. In these embodiments such a variation is obtained by pivoting the spraying plane. In the case of FIGS. 12a and 13a the spray devices comprise distributor tubes 65 with mouthpieces 66 attached to the same and inclined at an angle γ with respect to the vertical, as is the case in FIG. 11c. The angle of inclination γ of the spraying plane V may be changed to an angle γ' of a new spraying plane V' merely by lowering the cooling water inlet pressure.

In the case of the embodiments shown in FIGS. 12b and 13b the distributor tubes 65 with their mouthpieces 66 are mechanically pivoted about a horizontal axis which coincides with the axis A of the distributor tubes so as to obtain a different angle of inclination.

With the embodiments according to FIGS. 12a and 12b trickler plates 10 are used which have upper inclined sections such as shown, for instance, in FIGS. 2 to 6. In these cases consequently the spray device as well as the trickler plates are of a design which promotes the one-sided wetting of the trickler plates 10.

A simpler embodiment is shown in FIG. 13 with which either the trickler plates themselves or alignment plates 62 are vertically oriented along their entire widths.

Figure 14:
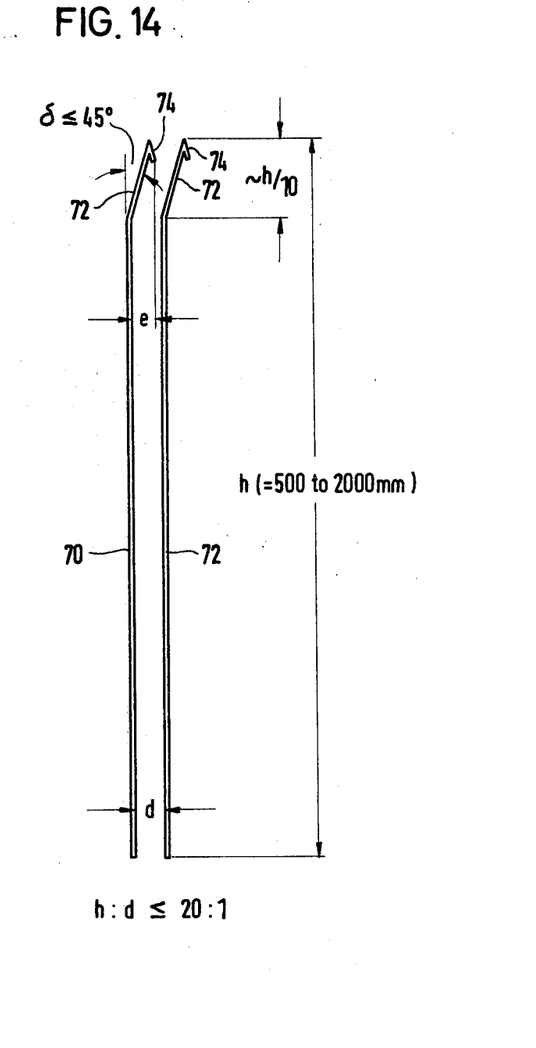

As shown in FIG. 14, trickler plates may comprise an elongated lower portion 70 and an upper portion 72 inclined to the vertical at an angle δ. Angle δ should not be greater than 45 degress and has a value of about 16.5 degrees in the preferred embodiment shown in FIG. 14. The ratio of the length h of the trickler plates to the horizontal spacing d therebetween is not greater than about 50:1 and preferably not greater than about 20:1. It is within the scope of the invention to provide a plurality of trickler plates in a defined vertical arrangement. In this case the combined dry and wet cooling takes place in the topmost layer for in the upper layers of the trickler plates and the upper limit of the ratio h/d concerns the topmost layer or the upper layers where the combined dry and wet cooling takes place.

The inclined portion 72 of each of the trickler plates may extend horizontally between about twenty percent and about one hundred ten percent of the spacing d between adjacent plates.

In the embodiment shown in FIG. 14, the inclined portions of the trickler plates have a horizontal extension e of about 75% of the spacing d. Keeping in mind that no droplets of water should fall through the gap between adjacent trickler plates but all the water should come in contact with the wet side of the trickler plates, it is surprising that, according the outfinding of the inventors, the inclined portions of adjacent trickler plates must not fully overlap or cover the spacing d, but may leave a distance of up to 80% of the spacing d uncovered. Even then all water droplets will come into contact with the wet side of the trickler plates. This phenomenon may be explained by the flow effects of the uprising air streams which will deflect the falling water droplets out of their vertical path onto the wet sides of the trickler plates.

The upper end of the upper portion 72 of the trickler plates may be bent downwardly to form a lip 74 useful in insuring that no water is downwardly sprayed onto the lip side of the trickler plates.

It will be understood that while the invention has been shown and described in connection with preferred forms, many changes will be obvious to one skilled in the art to which the invention pertains and may be made without departing from the scope of the invention as defined in the following claims.

What is claimed is:

1. A method of achieving both a wet cooling and a dry cooling effect in the same vertical space of a cooling tower comprising the steps of:
   (a) providing a plurality of spaced apart substantially vertical trickler plates, the ratio of the vertical height of said plates to the spacing between immediately adjacent plates being no greater than about 50:1;
   (b) depositing water to be cooled on only one side of each of the plurality of trickler plates at a rate to produce a substantially undisturbed thin film of water down that side of each of the plurality of trickler plates; and,
   (c) passing air up along both sides of each of the plurality of trickler plates as a result of natural draught along a substantially undisturbed path in contact with the water on one side of each of the trickler plates and out of contact with the water on the other side of each of the trickler plates, adjacent ones of said trickler plates forming a duct of substantially constant cross-section over substantially the entire vertical length of said trickler plates bounded on one side by a wet surface and on the other side by a dry surface, to thereby effect both wet and dry cooling in the same vertical space and to reduce the discharge of water particles out of the cooling tower.

2. The method of claim 1 wherein the depositing of water on each side of the plurality of trickler plates is accomplished by the steps of:
including the upper portion of each of the plurality of trickler plates to the vertical at an acute angle; and,
depositing the water to be cooled under the influence of gravity on the inclined portions of each of the plurality of trickler plates.

3. The method of claim 1 wherein the depositing of water on each of the plurality of trickler plates is accomplished by the spraying of the water to be cooled on the trickler plates at an acute angle to the trickler plates.

4. In a water cooling tower having an aperture at both the upper and lower end thereof, open to the atmosphere respectively for the entrance of air into the tower and for the exit thereof from the tower at a velocity substantially that created by natural draught, having means for introducing water to be cooled and for collecting the cooled water, and having both wet cooling and dry cooling of the water as it traverses the tower under the influence of gravity, means for accomplishing both wet and dry cooling of the water in the same vertical space with reduced discharge of water particles out of the cooling tower as a result of disturbance of the air path upward through the cooling tower and the water path down through the cooling tower to thereby reduce the generation of vapor clouds and bacteriological pollution, said means comprising:
a plurality of substantially planar trickler plates each having a substantially vertical orientation, the ratio of the substantially vertical length of said trickler plates to the substantially horizontal spacing between immediately adjacent ones of said trickler plates being no greater than about 50:1; and,
means for depositing water on only one side of each of said trickler plates so that the substantial vertical orientation of said trickler plates permits a substantially undisturbed low speed film flow of water on the wet surface of each of said trickler plates and permits a substantially undisturbed low speed flow of air on the dry side of each of said trickler plates, adjacent ones of said trickler plates forming a duct of substantially constant cross-section over substantially the entire vertical length of said trickler plates bounded on one side by a wet surface and on the other side by a dry surface,
whereby the air transiting each of the ducts thus formed is substantially undisturbed and the generation of vapor clouds and bacteriological pollution reduced.

5. The apparatus of claim 4 wherein each of said trickler plates has an upper end inclined to the vertical at an angle less than about 45 degrees, the vertical dimension of said upper end being not more than about 10 percent of the vertical height of said trickler plates.

6. The apparatus of claim 5 including a plurality of alignment plates having their widths oriented substantially vertically are arranged above said inclined portions of and parallel to said plurality of trickler plates, the lower ends of said alignment plates being laterally offset with respect to the upper ends of said trickler plates.

7. An apparatus as claimed in claim 6 including means for pivoting said trickler plates from a vertical position in which their upper ends are aligned with the lower ends of said alignment plates into a position in which their upper ends are offset laterally between the lower ends of said alignment plates.

8. An apparatus as claimed in claim 6 in which the upper ends of said trickler plates with inclined sections are vertically oriented.

9. An apparatus as claimed in claim 8 in which said alignment plates are pivotal from a position in which they are aligned with the upper ends of said trickler plates into a laterally offset intermediate position.

10. An apparatus as claimed in claim 8 in which one of said alignment plates and said trickler plates is arranged for parallel displacement with respect to the other of said trickler plates and said alignment plates.

11. The apparatus of claim 5 wherein the inclined upper end of each of the trickler plates projects horizontally for more than about 20 percent of the spacing between adjacent ones of said trickler plates.

12. The apparatus of claim 5 wherein the inclined upper end of each of said trickler plates projects horizontally for less than about 110 percent of the spacing between adjacent ones of said trickler plates.

13. Apparatus as claimed in claim 5 wherein the upper end of each of said trickler plates has a portion bent downwardly from the top thereof toward the dry side of the trickler plate.

14. The apparatus of claim 4 wherein said water depositing means includes means for directing the water to be cooled onto said plurality of trickler plates at an acute angle.

15. The apparatus of claim 4 in which said plurality of trickler plates are provided with bulges on the wet surfaces thereof.

16. The apparatus of claim 4 in which said alignment plates are inclined with respect to the vertical, in their upper sections.

17. An apparatus as claimed in claim 16 in which said alignment plates are corrugated in horizontal direction.

18. An apparatus as claimed in claim 16 in which the upper sections of said trickler plates are bent with respect to their lower, vertical sections.

19. An apparatus as claimed in claim 4 in which said trickler plates are provided in their upper section with downwardly oriented dripping noses and including guide means interconnecting said noses for guiding the trickling water toward the tips of the noses.

20. An apparatus as claimed in claim 19 in which said trickler plates support each other laterally by way of said dripping noses.

21. The apparatus of claim 4 wherein said means for depositing water on only one side of each of said trickler plates comprises:
a water spraying device arranged above said trickler plates, the main spraying plane of the water discharged from said water spraying device being inclined with respect to the vertical so that only one side of each of said trickler plates is wetted by the spraying water.

22. An apparatus as claimed in claim 21 in which the exit openings of said spray device are inclined with respect to the vertical.

23. An apparatus as claimed in claim 21 in which said water spraying device comprises inclined water jet deflecting profiles disposed below said vertically oriented exit openings and above said trickler plates.

24. An apparatus as claimed in claim 22 including means for varying the inclination of the spraying plane.

25. An apparatus as claimed in claim 24 in which the inlet pressure of the jet discharged from said spray devices is controllable in correspondence with the desired inclination of the spraying plane.

26. An apparatus as claimed in claim 24 including means for pivoting one of said spray device and said water jet deflecting profiles about a horizontal axis.

27. The apparatus of claim 4 wherein said ratio is not larger than about 20.

28. The apparatus of claim 4 wherein said ratio is not less than about 10.

* * * * *